(12) United States Patent
Tsutsumi et al.

(10) Patent No.: US 10,485,248 B2
(45) Date of Patent: Nov. 26, 2019

(54) PEARL-LIKE CAPSULE AND METHOD OF MANUFACTURING THE SAME

(71) Applicant: Sanshokaken K.K., Ikeda, Osaka (JP)

(72) Inventors: Hibiki Tsutsumi, Osaka (JP); Katsuhito Hatanaka, Osaka (JP)

(73) Assignee: Sanshokaken K. K., Osaka (JP)

( * ) Notice: Subject to any disclaimer, the term of this patent is extended or adjusted under 35 U.S.C. 154(b) by 283 days.

(21) Appl. No.: 15/232,022

(22) Filed: Aug. 9, 2016

(65) Prior Publication Data

US 2017/0049139 A1 Feb. 23, 2017

(30) Foreign Application Priority Data

Aug. 21, 2015 (JP) ................. 2015-164252

(51) Int. Cl.
| | | |
|---|---|---|
| *A23K 40/30* | (2016.01) | |
| *A23P 10/30* | (2016.01) | |
| *A23L 29/212* | (2016.01) | |
| *A23L 29/256* | (2016.01) | |
| *A23K 10/38* | (2016.01) | |
| *A23K 20/105* | (2016.01) | |
| *A23K 20/147* | (2016.01) | |
| *A23K 20/163* | (2016.01) | |
| *A23K 20/24* | (2016.01) | |
| *A23K 50/70* | (2016.01) | |
| *A23K 50/75* | (2016.01) | |
| *A23K 50/40* | (2016.01) | |
| *A23K 50/80* | (2016.01) | |

(52) U.S. Cl.
CPC .............. *A23K 40/30* (2016.05); *A23K 10/38* (2016.05); *A23K 20/105* (2016.05); *A23K 20/147* (2016.05); *A23K 20/163* (2016.05); *A23K 20/24* (2016.05); *A23K 50/40* (2016.05); *A23K 50/70* (2016.05); *A23K 50/75* (2016.05); *A23K 50/80* (2016.05); *A23L 29/212* (2016.08); *A23L 29/256* (2016.08); *A23P 10/30* (2016.08); *Y02P 60/873* (2015.11)

(58) Field of Classification Search
CPC .......... A23K 40/30; A23P 10/30; A23P 10/35; A23L 29/256
See application file for complete search history.

(56) References Cited

U.S. PATENT DOCUMENTS

| | | | | |
|---|---|---|---|---|
| 5,942,266 | A * | 8/1999 | Okamura ................. | A23D 9/04 426/573 |
| 2006/0029710 | A1* | 2/2006 | McPherson .............. | A23G 9/34 426/565 |
| 2007/0259097 | A1* | 11/2007 | Andersen ................. | A61J 3/07 427/2.22 |
| 2008/0107777 | A1* | 5/2008 | Butler .................... | A23P 10/30 426/71 |

FOREIGN PATENT DOCUMENTS

| | | |
|---|---|---|
| JP | 48-16183 | 5/1973 |
| JP | 3238350 B2 | 12/2001 |
| WO | 2014192566 A1 | 12/2014 |

OTHER PUBLICATIONS

"Sake Types and Flavor Profiles". Available online from http://www.esake.com as of Apr. 24, 2011. pp. 1-5. (Year: 2011).*
Itoh, Makiko. "With sake rice, nothing goes to waste". Available online from https://www.japantimes.co.jp as of Jan. 28, 2011. pp. 1-5. (Year: 2011).*
Japanese Patent Office, Office Action dated Apr. 12, 2019 for application No. Tokugan 2015-164252.

* cited by examiner

*Primary Examiner* — Jenna A Watts
(74) *Attorney, Agent, or Firm* — Brown & Michaels, PC

(57) ABSTRACT

The invention aims to provide a pearl-like capsule that can encapsulate a large amount of fatty substances and a method of manufacturing the same, wherein the pearl-like capsule is less deformable and/or less shrinkable even under freeze-thaw and thus is convenient for transportation and preservation. The pearl-like capsule has a structure where outer surface of a droplet is coated with water-insoluble coating of alginate and then coated with a coating consisting of glycerine, wherein the droplet includes water-soluble macromolecule, fatty substances, water-soluble multivalent metallic salt, rice lees, and starch.

4 Claims, No Drawings

PEARL-LIKE CAPSULE AND METHOD OF MANUFACTURING THE SAME

TECHNICAL FIELD

The present invention relates to a pearl-like capsule that is less deformable and/or less shrinkable even under repeated freeze-thaw, and a method of manufacturing the same. More particularly, the invention relates to a pearl-like capsule that has a structure where outer surface of a droplet including water-soluble macromolecule, fatty substances, water-soluble multivalent metallic salt sake lees, and starch is coated with water-insoluble coating of alginate and then coated with a coating consisting of glycerine, and a method of manufacturing the same, wherein the pearl-like capsule is less deformable and/or less shrinkable even under freeze-thaw so that it is not only convenient for transportation or preservation but also able to contain a large amount of fatty substances.

In this specification, the term "pearl-like" includes all spherical bodies, such as ball-shaped, oval-shaped, and deformed ball-like bodies.

An edible capsule encapsulating a fluid as a core material is applied as artificial salmon caviar and jellies, etc.

For example, Patent Document 1 states a method of manufacturing a stable capsule body containing a fluid comprising contacting a mixture obtained by adding multivalent metallic salt to the fluid constituting a core part of the capsule body, with a solution of alginate, low methoxyl pectin, or a mixture thereof to form a gelatinous coating, and that the manufactured capsule body can be applied as jelly food, ice cream additives, medical capsules, and nutrient capsules.

However, the capsule in the Patent Document 1 is broken when it contains a large amount of fatty substance in its core material. Accordingly, the capsule has a problem that it can encapsulate only a little amount of fatty substances and thus is limitedly applied for food.

An edible capsule that can contain a large amount of fatty substances includes the invention of Patent Document 2 made by the inventors.

The document states a method of manufacturing an edible capsule comprising contacting a droplet consisting of quince (*Cydonia oblonga*) seed mucilage, water-soluble multivalent metallic salt, fatty substances, and salt with aqueous solution of water-soluble alginate to form water-insoluble coating of alginate on outer surface of the droplet. It also states that the droplet contains the quince seed mucilage mainly comprising cydonin and fat amygdalin obtained from the quince seed to prepare an edible capsule containing a large amount of fatty substances.

However, the invention in the document has a problem that the capsule cannot be frozen and thus is inconvenient for transportation and long-term preservation.

As described above, it was difficult to manufacture a pearl-like capsule that can encapsulate a large amount of fatty substances and can be frozen even by the use of the art indicated by the patent documents 1 and 2. Therefore, there has been a need in the art for a pearl-like capsule that is freezable and convenient for transportation and long-term preservation.

PRIOR ART DOCUMENTS

Patent Documents

[Patent document 1] Japanese Examined Patent Publication No. 48-16183

[Patent document 2] Japanese Patent No. 3238350

SUMMARY OF THE INVENTION

Problems to be Solved by the Invention

In order to solve the problems in the Patent Documents 1 and 2, the inventors suggest in Japanese Patent Application No. 2013-110458 that outer surface of water-insoluble coating of alginate is coated with a coating consisting of antifreeze glycerine. The invention described in Japanese Patent Application No. 2013-110458 provides an edible capsule that can encapsulate a large amount of fatty substances and can be frozen by including quince seed mucilage in an droplet as the invention described in the Patent Document 2, and by forming a coating consisting of antifreeze glycerine on outer surface of water-insoluble coating of alginate.

After careful consideration, however, the inventors found that the invention in Japanese Patent Application No. 2013-110458 has a problem; a freezable edible capsule provided in the document is, when frozen, surface-recessed to deform and/or shrink due to decrease in volume of fatty substances, resulting in disfigurement.

The present invention aims to solve the above-described problems and through extensive studies, the inventors surprisingly succeeded in manufacturing a pearl-like capsule that can encapsulate a large amount of fatty substances and is less deformable and/or less shrinkable even under repeated freeze-thaw by adding sake lees and starch to a droplet.

Accordingly, the present invention can provide a pearl-like capsule that is less deformable and/or less shrinkable even under freeze-thaw and thus is convenient for transportation and preservation and can contain a large amount of fatty substances.

Means for Solving the Problems

The invention according to first aspect relates to a pearl-like capsule having a structure where outer surface of a droplet is coated with water-insoluble coating of alginate and then coated with a coating consisting of glycerine, wherein the droplet includes water-soluble macromolecule, fatty substances, water-soluble multivalent metallic salt, sake lees, and starch.

The invention according to second aspect relates to the pearl-like capsule of the first aspect, wherein the starch is at least any one of potato starch, rice starch, and Irish potato starch.

The invention according to third aspect relates to the pearl-like capsule of the first or second aspect, wherein the water-soluble macromolecule is a quince seed mucilage.

The invention according to fourth aspect relates to the pearl-like capsule of the first to third aspects, wherein the water-soluble multivalent metallic salt is water-soluble calcium salt.

The invention according to fifth aspect relates to a method of manufacturing a pearl-like capsule comprising: contacting a droplet including water-soluble macromolecule, fatty substances, water-soluble multivalent metallic salt, sake lees, and starch with aqueous solution of water-soluble alginate to form water-insoluble coating of the alginate on outer surface of the droplet, and contacting the droplet coated with the water-insoluble coating of the alginate with glycerol aqueous solution to form a coating consisting of glycerine on the outer surface of the water-insoluble coating of the alginate.

The invention according to sixth aspect relates to the method of the fifth aspect, wherein the starch is at least any one of potato starch, rice starch, and Irish potato starch.

The invention according to seventh aspect relates to the method of the fifth or sixth aspect, wherein the water-soluble macromolecule is a quince seed mucilage.

The invention according to eighth aspect relates to the method of the fifth to seventh aspects, wherein the water-soluble multivalent metallic salt is water-soluble calcium salt.

Effects of the Invention

According to the first aspect, it is possible to manufacture a freezable pearl-like capsule by coating outer surface of a droplet with water-insoluble coating of alginate and then coating the outer surface of the water-insoluble coating of alginate with a coating consisting of antifreeze glycerine.

It is also possible to encapsulate a large amount of fatty substances in the capsule by including water-soluble macromolecule in the droplet as the macromolecule plays a role of as an emulsifier.

Furthermore, it is possible to prepare a pearl-like capsule that is less deformable and/or less shrinkable even under repeated freeze-thaw and thus is convenient for transportation and long-term preservation and can encapsulate a large amount of fatty substances, by including sake lees and starch in the droplet. This is because: 1) the sake lees play a role in the droplet as an emulsifier so that the capsule can encapsulate a large amount of fatty substances, and 2) the droplet including starch gelates when heated, causing little change in the volume of the droplet even containing a large amount of fatty substances and less deformation of the capsule when it is frozen.

According to the second aspect, it is possible to prepare a pearl-like capsule that is much less deformable even when frozen by including in a droplet a starch selected from at least one of potato starch, rice starch, and Irish potato starch. More specifically, it is easy to force a composition constituting the droplet out of nozzle as the composition containing at least one of these starches has low viscosity at room temperature. Accordingly, this has a remarkable effect that the droplet including the starch gelates when heated, causing little change in the volume of the droplet even containing a large amount of fatty substances and less deformation of the capsule when it is frozen.

According to third aspect, it is possible to prepare a pearl-like capsule that can not only be edible but also encapsulate a very large amount of fatty substances by using a quince seed mucilage as a water-soluble macromolecule, without losing the texture of the droplet since it does not gelate in the presence of water-soluble multivalent metallic salt. It is also easy to force the composition of the droplet out of nozzle since it has appropriate viscosity with the ingredients encapsulated or dissolved therein and has low spinnability.

According to the fourth aspect, it is possible to prepare a pearl-like capsule coated with a strong water-insoluble coating by using water-soluble calcium salt that is easy to dissolve in water and compatible with alginate as a water-soluble multivalent metallic salt. Furthermore, it is possible to reduce the production cost of a soluble pearl-like capsule by using as a water-soluble multivalent metallic salt a water-soluble calcium salt that is inexpensive and easily available.

According to the fifth aspect, it is possible to manufacture a pearl-like capsule that can encapsulate a large amount of fatty substances and can be frozen by a method of manufacturing a pearl-like capsule comprising contacting a droplet including water-soluble macromolecule, fatty substances, water-soluble multivalent metallic salt, sake lees, and starch with aqueous solution of water-soluble alginate to form water-insoluble coating of the alginate on outer surface of the droplet, and contacting the droplet coated with the water-insoluble coating of the alginate with glycerol aqueous solution to form a coating consisting of glycerine on the outer surface of the water-insoluble coating of the alginate.

It is also possible to manufacture a pearl-like capsule that is less deformable and/or less shrinkable even under freeze-thaw and thus is convenient for transportation and long-term preservation by including sake lees and starch in the droplet.

This is because: 1) the sake lees play a role in the droplet as an emulsifier so that it can facilitate mixing of ingredients including fatty substances to smoothly provide a droplet, and 2) the droplet including starch gelates when heated, causing little change in the volume of the droplet even containing a large amount of fatty substances and less deformation of the capsule when it is frozen.

According to the sixth aspect, it is possible to manufacture a pearl-like capsule that is much less deformable even when frozen by including a starch selected from at least one of potato starch, rice starch, and Irish potato starch. More specifically, it is easy to force the droplet out of nozzle as the droplet has low viscosity at room temperature due to the use of these starches, and this has a remarkable effect that the droplet including starch gelates when heated, causing little change in the volume of the droplet even containing a large amount of fatty substances and less deformation of the capsule when it is frozen.

According to the seventh aspect, by using a quince seed mucilage as a water-soluble macromolecule, it is possible to manufacture a pearl-like capsule that can be edible and contain a very large amount of fatty substances, without losing the texture of the capsule since the droplet does not gelate even in the presence of water-soluble multivalent metallic salt. It is also easy to force the droplet out of nozzle since the droplet has moderate viscosity with some ingredients encapsulated or dissolved therein and has low spinnability.

According to the eighth aspect, it is possible to manufacture a pearl-like capsule coated with a strong water-insoluble coating by using water-soluble calcium salt that is easy to dissolve in water and compatible with alginate as a water-soluble multivalent metallic salt. Furthermore, it is possible to reduce the production cost of a soluble pearl-like capsule by using as a water-soluble multivalent metallic salt a water-soluble calcium salt that is inexpensive and easily available.

DESCRIPTION OF EMBODIMENTS

A pearl-like capsule according to the present invention and mainly a method of manufacturing the same will now be described in detail.

A composition that constitutes a droplet in the manufacturing method of the present invention contains water-soluble macromolecule, fatty substances, water-soluble multivalent metallic salt, sake lees, and starch. In the composition, the water-soluble macromolecule and the water-soluble multivalent metallic salt are dissolved in water, while the sake lees and the starch are dispersed in water.

Water-soluble macromolecule containing a mucilage obtained from quince seed is used as water-soluble macromolecule. Hereinafter, "mucilage obtained from quince seed" is abbreviated to "quince seed mucilage". The rate of the water-soluble macromolecule aqueous solution containing the quince seed mucilage to the whole pearl-like capsule is preferably 1 to 40 percent by weight, and most preferably about 20 percent by weight.

The quince (*Cydonia oblonga*) is a tall or small deciduous tree, a member of the genus *Cydonia* in the family Rosaceae, and is native to Central Asia, such as Persian and Turkestan areas. Its fruit is in a shape of pear or apple, gives off a fragrance, and is covered with fine white vellus. Its leaves are alternate and covered with fine white vellus like its pericarp. The color of its flower is white or pink.

The quince seed mucilage is typically obtained by immersing a quince seed in water or heated water, extracting a viscous material from the seed over a few to about 24 hours while occasionally stirring, and then finally filtrating the viscous material to remove the seed. The quince seed mucilage mainly comprises a mucilaginous material called cydonin and fat amygdalin.

Water-soluble macromolecules other than quince seed mucilage includes, for example, various kinds of water-soluble macromolecules originating in animals and plants or microbiologicals, such as carboxymethylcellulose, methyl cellulose, dextrin, starch, starch glycolate, xanthan gum, guar gum, mannan, agar, gellan gum, locust bean gum, carrageenan, gum arabic, gum tragacanth, karaya gum, succinoglucan, pullulan, dextran, curdlan, zein, trehalose, soybean protein, glue, gelatin, albumin, casein, pectin, and gluten. Among these macromolecules, xanthan gum, guar gum, gum tragacanth, and karaya gum are relatively preferable.

However, the quince seed mucilage contains extremely large amount of fatty substances compared with the above-described water-soluble macromolecule. Some water-soluble macromolecules have high spinnability and gelate in the presence of water-soluble multivalent metallic salt, leading to loss of stability of a composition. Accordingly, please note that selection of a water-soluble macromolecule or its amount used with the quince seed mucilage should not compromise the purpose of the present invention.

Examples of a fatty material include a vegetable oil (such as rice oil, salad oil, soybean oil, sesame oil, rapeseed oil, *arachis* oil, safflower oil, sunflower oil, corn germ oil, cotton seed oil, or rice bran oil), butter, lard, egg-yolk oil, DHA, EPA, or squalane, etc. Processed materials, such as mayonnaise, ketchup, and margarine, can be also suitably used as a fatty material.

Water-soluble calcium salts, such as calcium chloride, calcium lactate, and calcium acetate, are suitably used as a water-soluble multivalent metallic salt, since they are inexpensive and compatible with alginate.

Sake lees are used as an emulsifier and are essential elements for manufacturing a pearl-like capsule which is less deformable even under freezing.

Sake lees may preferably have emulsification, i.e., any of Itakasu (sake lees in a block), Barakasu (Small pieces of sake lees), and Nerikasu (kneaded sake lees), and may be preferably made from any of Japanese sake, i.e., Junmai Daiginjo-shu (pure rice, very special brew; ingredients: rice, kōji rice; rice polishing ratio: below 50%), Daiginjo-shu (very special brew; ingredients:rice, kōji rice, distilled alchohol; rice polishing ratio: below 50%), Junmai Ginjo-shu (pure rice, special brew; ingredients: rice, kōji rice; rice polishing ratio: below 60%), Ginjo-shu (special brew; ingredients: rice, kōji rice, distilled alcohol; rice polishing ratio: below 60%), Special Junmai-shu (special pure rice; ingredients: rice, kōji rice; rice polishing ratio: below 60% or produced by special brewing method), Junmai-shu (pure rice; ingredients: rice, kōji rice; rice polishing ratio: below 70%), Tokubetsu Honjozo-shu (special genuine brew; ingredients: rice, kōji rice, distilled alcohol; rice polishing ratio: below 60% or produced by special brewing method), Honjozo-shu (genuine brew; ingredients: rice, kōji rice, distilled alcohol; rice polishing ratio: below 70%), and Futsu-shu (ordinary quality sake).

Starch can be easily ejected from a nozzle to be a droplet before being heated and there is little volume change of the droplet containing many fatty materials even under freezing since it gelates after being heated. Thus, it is an essential element for manufacturing a pearl-like capsule which is less deformable.

At least any one of potato starch, rice starch, and Irish potato starch is suitably used as a starch. Any one of them and a combination thereof have same effects. However, it is not preferable to use a corn starch or wheat starch, since gel strength cannot be achieved which avoids volume change of the fatty material.

On the other hand, a sodium salt or potassium salt of alginic acid is suitably used as a water-soluble alginate. The reason is that a sodium salt or potassium salt of alginic acid has following effects: it instantly forms a film and thus can contain encapsulating components to form a neat circular capsule; it can be encapsulated without being heated; and the capsule does not melt even with heating.

In manufacturing a pearl-like capsule, a droplet of the composition containing a water-soluble macromolecule, in which at least 50% by weight of the droplet is quince seed mucilage, fatty materials, water-soluble multivalent metallic salt, sake lees, and starch is allowed to contact with aqueous solution of water-soluble alginate. Any methods of dropping and ejecting the composition consisting of the above-described components from the nozzle are adopted to prepare a droplet.

A ratio of each component in the above-described composition can be chosen from a wide range. The ratio is often as follows; a water-soluble macromolecule aqueous solution: 1 to 40% by weight, fatty materials: 10 to 95% by weight (particularly 30 to 50% by weight), water-soluble multivalent metallic salt: 0.05 to 3% by weight, sake lees: 1 to 10% by weight (particularly 2 to 6% by weight), and starch: 10 to 20% by weight (particularly 11 to 15% by weight), of 100% by weight of the whole composition.

The ratio of water which is a solvent component in the composition is often set to be 1 to 89% by weight (particularly 5 to 80% by weight, and more particularly 10 to 70% by weight).

In a water-soluble macromolecule aqueous solution, in which a ratio of the quince seed mucilage in the whole pearl-like capsule is 1 to 40% by weight, too little quince seed mucilage causes a decrease in possible quantity of encapsulating fatty materials and too much quince seed mucilage breaks the balance of the composition. Too few fatty materials diminish significance in the edible capsule, and extremely too many fatty materials break the capsule. Too few water-soluble multivalent metallic salts cause a decrease in strength of the formed capsule, and too many water-soluble multivalent metallic salts make the taste bad.

The above-described composition may appropriately include effective components, such as an amino acid, chemical seasoning, squid ink, spice, vitamins, food extracts (green tea, green soup, etc.), and minerals, and additives, such as specific gravity adjuster such as glycerol, a coloring agent, food flavor, filler, and preservatives (sodium benzoate, etc.), as well as the above-described water-soluble macromolecule, fatty materials, water-soluble multivalent metallic salt, sake lees, and starch.

The aqueous solution of water-soluble alginate can also include these useful components and additives.

Concentration of alginate in the aqueous solution in contact with the above-described droplet of the composition is often set to be about 0.01 to 5% by weight, particularly about 0.05 to 3% by weight, and more particularly about 0.1 to 2% by weight.

Contacting the above-described droplet of the composition with the aqueous solution of water-soluble alginate forms a water-insoluble coating of alginate on the outer surface of the droplet (coating of a calcium alginate when a water-soluble multivalent metallic salt in the droplet is a calcium salt), and thus the capsule can be washed as necessary.

Besides, in the above-described contacting process, since significant amounts of anion residue and water of water-soluble multivalent metallic salt move toward the aqueous solution of alginate, the obtained droplet in the capsule will become rich in fatty materials.

After the water-insoluble coating is formed as described above, heat is applied to the capsule. It is preferable to heat the capsule to about 70° C. since a capsule may burst if the heating temperature is too high. A glycerol aqueous solution is then contacted with the capsule to form a coating which consists of glycerin on the outer surface of the water-insoluble coating of alginate. The outer surface of the capsule is coated with glycerin which is also used as an antifreezing fluid to afford a pearl-like capsule which can be frozen.

The size of the pearl-like capsule as obtained above is often, but is not particularly limited to, about 0.5-15 mm, particularly about 1-10 mm in diameter.

The pearl-like capsule of the present invention, having a structure where the outer surface of the above-described droplet is coated with the water-insoluble coating of alginate and further coated with the coating consisting of glycerin thereon, is put into a container as it is, with being soaked with an appropriate liquid, or with being floated or precipitated in the appropriate liquid to be handled. Containers such as a usual bottle and bin, containers equipped with a mechanism for taking out the pearl-like capsule as it is, and containers equipped with a mechanism for intentionally crushing the pearl-like capsule when it is taken out can be also used as a container.

This pearl-like capsule may be eaten as a side dish or with being put on a hand-rolled sushi, rice, bread, biscuit, cake, salad, etc. It can be also used as a feed for pets or domestic animals such as a dog, cat, bird, paltry, and a fish. This pearl-like capsule can be also taken in as a confectionery, ice cream additive, medical capsules, nutrient capsules, etc. This pearl-like capsule can be also used as cosmetics.

<Effect>

The formation of the pearl-like capsule of the present invention utilizes the characteristics of the droplet consisting of the above-described composition in contact with the aqueous solution of water-soluble alginate to turn the water-soluble alginate around the droplet into a water-insoluble alginate due to the water-soluble multivalent metallic salt in this droplet and form a water-insoluble coating.

In addition, the capsule can be edible by using a quince seed mucilage as a water soluble macromolecule in the droplet consisting of the above-described components, can encapsulate extremely a large amount of fatty materials since the quince seed mucilage plays a role as an emulsifier, does not gelate even under the presence of a water-soluble multivalent metallic salt, can also contain a large amount of salts, shows appropriate viscosity in a state where it encapsulates or dissolves those components, and has low spinnability. Accordingly, it is easy to eject the composition from the nozzle and turn it into a droplet.

Conventionally, in order to obtain a capsule encapsulating fatty materials, it was required to take complicate means, such as to eject fatty materials from an inner tube and aqueous solution of the water-soluble macromolecule containing water-soluble multivalent metallic salt from an outer tube by using a double nozzle, or adopt a method of emulsifying fatty materials using an artificial surfactant, etc. However, in the present invention, since the quince seed mucilage is used as a water-soluble macromolecule, a droplet can be smoothly prepared only by stirring and mixing the component and ejecting it from the nozzle, even in a system where a large amount of fatty materials are blended without using an artificial surfactant and water-soluble multivalent metallic salts are blended, thereby obtaining an intended pearl-like capsule.

Further in the present invention, the droplet contains sake lees and starch, allowing for inclusion of a large amount of fatty materials and formation of a pearl-like capsule which is less deformable and/or less shrinkable even under repeated freeze-thaw. This is because: 1) the sake lees play a role in a droplet as an emulsifier so that it can facilitate mixing of ingredients including fatty materials to smoothly provide a droplet, and 2) the capsule can contain a large amount of fatty materials, and because the droplet including starch gelates when heated, causing little change in the volume of the droplet even containing a large amount of fatty materials and less deformation of the capsule when it is frozen.

EXAMPLE

Hereinafter, the effects of the present invention become clearer by showing examples with respect to the pearl-like capsule according to the present invention and a manufacturing method thereof. However, the present invention is not limited to the following examples.

<Preparation of Quince Seed Mucilage Aqueous Solution>

2.7 g of quince seed was immersed in 86.0 g of distilled water and stirred for 3 hours at 60° C. using a hot stirrer. The quince seed was then removed by filtration to afford a quince seed mucilage aqueous solution.

<Preparation of Aqueous Solution of Alginate>

2.25 g of sodium alginate was added to 597.75 g of distilled water and stirred until complete dissolution to afford an aqueous solution of alginate.

Example 1

1.00 g of calcium chloride and 1.00 g of sake lees were added to 3.00 g of water and stirred while grinding the sake lees until their dispersion. 15.00 g of potato starch and 40.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min, reacted for 1 min, and then washed with water to obtain a pearl-like capsule.

Example 2

1.00 g of calcium chloride and 5.00 g of sake lees were added to 24.00 g of water and stirred while grinding the sake lees until dispersed. 20.00 g of potato starch and 10.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min, reacted for 1 min, and then washed with water to obtain a pearl-like capsule.

Example 3

1.00 g of calcium chloride and 10.00 g of sake lees were added to 38.00 g of water and stirred while grinding the sake lees until dispersed. 10.00 g of potato starch and 1.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min, reacted for 1 min, and then washed with water to obtain a pearl-like capsule.

Comparative Example 1

1.00 g of calcium chloride and 0.05 g of sake lees were added to 42.95 g of water and stirred while grinding the sake lees until dispersed. 15.00 g of potato starch and 1.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min.

Comparative Example 2

1.00 g of calcium chloride and 5.00 g of sake lees were added to 41.00 g of water and stirred while grinding the sake lees until dispersed. 3.00 g of potato starch and 1.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min, reacted for 1 min, and then washed with water to obtain a pearl-like capsule.

Comparative Example 3

1.00 g of calcium chloride and 10.00 g of sake lees were added to 38.00 g of water and stirred while grinding the sake lees until dispersed. 10.00 g of corn starch and 1.00 g of quince seed mucilage aqueous solution were then added and stirred, and 40.00 g of rice oil was further added and stirred well. It was then filtered through a metallic mesh and the filtrate was used as a dropping liquid.

This dropping liquid was dropped into the aqueous solution of alginate at the rate of 100 mL/min, reacted for 1 min, and then washed with water to obtain a pearl-like capsule.

Also, in all of the Comparative Examples and Examples, the dropping liquid was dropped from the nozzle with a diameter of 2 mm.

<Preparation of Pearl-Like Capsule Having Coating which Consists of Glycerin>

In all of the Comparative Examples and Examples, a coating consisting of glycerin was coated on the outer surface of the water-insoluble coating of alginate by the following procedures.

Water was added to a container containing the above-described pearl-like capsule and filtered immediately after heating at about 70° C., and the capsule was collected. The capsule was put in 80% of glycerol aqueous solution and collected, and excessive glycerin attached to the surface of the capsule was removed.

<Change in Shape of Pearl-Like Capsule by Freeze-Thaw>

The pearl-like capsule shown in the above-described Comparative Examples and Examples was stored for one day at −20° C. and then returned to normal temperature. The results are shown in Table 1 below.

TABLE 1

| Examples | Maintenance of Shape of Capsule | Note |
| --- | --- | --- |
| Example 1 | Yes | Almost all shapes of the capsules were maintained. |
| Example 2 | Yes | Almost all shapes of the capsules were maintained. |
| Example 3 | Yes | Almost all shapes of the capsules were maintained. |
| Comparative Example 1 | No | The dropping liquid was separated and not encapsulated. |
| Comparative Example 2 | No | The gel strength of the droplet was not sufficient and its volume changed. |
| Comparative Example 3 | No | The gel strength of the droplet was not sufficient and its volume changed. |

In Examples 1-3, almost all shapes of the pearl-like capsules were able to be maintained. And even after several freeze-thaw, almost all shapes of these pearl-like capsules were able to be maintained.

On the other hand, in Comparative Example 1, since there were small amounts of sake lees, water and oil contents of the dropping liquid were separated in dropping a dropping liquid and the dropping liquid was not encapsulated.

In Comparative Example 2, since there were small amounts of potato starch, gel strength of the droplet was not sufficient even if it was heated. When the capsule was frozen, volume change of the droplet occurred, and 90% of the capsules were deformed.

In Comparative Example 3, since corn starch was used instead of potato starch, gel strength which avoids volume change of fatty materials could not be obtained. when the capsule was frozen, volume change of the droplet occurred, and 90% of the capsules were deformed.

Accordingly, it was revealed that the pearl-like capsules which contain sake lees and starch at the appropriate rate (sake lees: 1-10% and starch: 10-20% of 100% by weight of the whole composition) as shown in Examples 1-3 are highly effective in maintaining their shapes without deformation and/or shrinkage even after freeze-thaw, compared with the pearl-like capsules which have low ratio of sake lees or starch as shown in Comparative Examples 1-2. Moreover, as shown in Comparative Example 3, if corn starch is used among starch, the capsule was deformed and/or shrunk after freeze-thaw. And thus it was found out that potato starch is suitable for the application of the present invention.

INDUSTRIAL APPLICABILITY

The present invention can maintain its shape without deformation and/or shrinkage even after freeze-thaw. And thus it can be utilized as a pearl-like capsule which can contain a large amount of fatty materials for the purpose of being used after transported in a frozen state and/or preserved at low temperature.

This pearl-like capsule may be eaten as a side dish or with being put on a hand-rolled sushi, rice, bread, biscuit, cake, salad, etc. It can be also used as a feed for pets or domestic animals such as a dog, cat, bird, paltry, and a fish. This pearl-like capsule can be also taken in as a confectionery, ice cream additive, medical capsules, nutrient capsules, etc. This pearl-like capsule can be also used as cosmetics.

What is claimed is:

1. A pearl-like capsule comprising:
    a droplet having an outer surface, a 0.5 millimeter to 15 millimeter diameter, and including a water-soluble macromolecule, fatty substances, a water-soluble multivalent metallic salt, sake lees, and starch;
    a water-insoluble coating of alginate on the outer surface of the droplet; and
    a glycerine coating on the water-insoluble coating of alginate, wherein the sake lees derive from any sake selected from a group consisting of Junmai Daiginjo-shu, Daiginjo-shu, Junmai Ginjo-shu, Ginjo-shu, Special Junmai-shu, Junmai-shu, Tokubetsu Honjozo-shu, Honjozo-shu, and Futsu-shu,
    wherein said water-soluble macromolecule is a quince seed mucilage,
    wherein the sake lees include amino acid,
    wherein the starch includes at least one of Irish potato starch, other potato starch, and rice starch, and
    wherein the sake lees are 1% to 10% by weight of the droplet and the starch is 10% to 20% by weight of the droplet.

2. The pearl-like capsule according to claim 1, wherein said water-soluble multivalent metallic salt is water-soluble calcium salt.

3. A method of manufacturing a pearl-like capsule 0.5 millimeters to 15 millimeters in diameter, the method comprising:
    removing hulls of rice to obtain rice kernels;
    performing alcohol fermentation of the rice kernels to obtain sake and sake lees;
    separating the sake and the sake lees;
    contacting a droplet including a water-soluble macromolecule, fatty substances, a water-soluble multivalent metallic salt, sake lees, starch and an outer surface with an aqueous solution of water-soluble alginate to form a water-insoluble coating of said alginate on the outer surface of the droplet; and
    contacting said droplet coated with said water-insoluble coating of said alginate with glycerol aqueous solution to form a glycerine coating on the water-insoluble coating of said alginate,
    wherein the sake lees derive from any sake selected from a group consisting of Junmai Daiginjo-shu, Daiginjo-shu, Junmai Ginjo-shu, Ginjo-shu, Special Junmai-shu, Junmai-shu, Tokubetsu Honjozo-shu, Honjozo-shu, and Futsu-shu,
    wherein said water-soluble macromolecule is a quince seed mucilage,
    wherein the sake lees include amino acid,
    wherein the starch includes at least one of Irish potato starch, other potato starch, and rice starch, and
    wherein the sake lees are 1% to 10% by weight of the droplet and the starch is 10% to 20% by weight of the droplet.

4. The method according to claim 3, wherein said water-soluble multivalent metallic salt is water-soluble calcium salt.

* * * * *